United States Patent
Freeman et al.

(10) Patent No.: US 7,646,327 B1
(45) Date of Patent: Jan. 12, 2010

(54) SYNTHETIC APERTURE RADAR MOTION ESTIMATION METHOD

(75) Inventors: Will Freeman, Ridgecrest, CA (US); Duane Roth, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/182,910

(22) Filed: Jul. 30, 2008

(51) Int. Cl.
*G01S 13/90* (2006.01)

(52) U.S. Cl. .................. 342/25 B; 342/25 D; 342/25 F; 342/162; 342/194; 342/196

(58) Field of Classification Search ............... 342/25 R, 342/25 A–25 F, 159–162, 192, 194–196
See application file for complete search history.

(56) References Cited

U.S. PATENT DOCUMENTS

| | | | | |
|---|---|---|---|---|
| 4,771,287 A | * | 9/1988 | Mims | 342/25 A |
| 4,851,848 A | * | 7/1989 | Wehner | 342/25 D |
| 5,233,354 A | * | 8/1993 | Roth et al. | 342/160 |
| 5,250,952 A | * | 10/1993 | Roth | 342/25 F |
| 5,608,404 A | * | 3/1997 | Burns et al. | 342/25 A |
| 5,677,693 A | * | 10/1997 | Frankot et al. | 342/25 C |
| 5,818,383 A | * | 10/1998 | Stockburger et al. | 342/109 |
| 6,400,306 B1 | * | 6/2002 | Nohara et al. | 342/25 R |
| 7,046,582 B1 | * | 5/2006 | Kosalos et al. | 367/88 |
| 7,133,326 B2 | * | 11/2006 | Kerfoot et al. | 367/88 |
| 7,212,149 B2 | * | 5/2007 | Abatzoglou | 342/25 F |
| 2005/0280571 A1 | * | 12/2005 | Abatzoglou et al. | 342/25 B |
| 2008/0042893 A1 | * | 2/2008 | Connell et al. | 342/25 F |

\* cited by examiner

*Primary Examiner*—John B Sotomayor
(74) *Attorney, Agent, or Firm*—Christopher Blackburn

(57) ABSTRACT

A target object motion estimation method using at least one subset of a complex SAR image. Coarse range cell alignment is performed on at least one subset of a complex SAR image. At least one subset is autofocused, thereby providing an estimated phase error function. The estimated phase error function yielded by autofocusing (or a manipulated version of the phase error function) may be analyzed to detect, characterize, and estimate target object motion.

20 Claims, 2 Drawing Sheets

US 7,646,327 B1

SYNTHETIC APERTURE RADAR MOTION ESTIMATION METHOD

BACKGROUND OF THE INVENTION

The present invention relates generally to object motion recognition. More particularly, the present invention relates to a method of detecting and estimating object motion through a process involving autofocusing subset(s) of complex Synthetic Aperture Radar ("SAR") images.

SAR autofocus techniques have been designed and used to remove the phase error in the entire image that is still present after reformatting and motion compensation to improve image quality. Two such techniques that correct for cubic and higher ordered errors respectively are (Y. G. Niho "Phase Difference Auto Focusing for Synthetic Aperture Radar Imaging," U.S. Pat. No. 4,999,635, Filed Mar. 29, 1990, issued Mar. 12, 1991) and (P. H. Eichel, D. C. Ghiglia, and C. V. Jakowatz, "Phase Correction System for Automatic Focusing of Synthetic Aperture Radar," U.S. Pat. No. 4,924,229, Filed Sep. 14, 1989, issued May 8, 1990).

While the above techniques work for their intended purpose of correcting for the phase error in the overall complex image, i.e., correcting for the phase error that has defocused the entire image, they do not detect or estimate isolated object motion very well.

BRIEF SUMMARY OF THE INVENTION

The present invention relates to a technique for detecting and estimating object motion within a complex Synthetic Aperture Radar ("SAR") image. The technique can be used to detect and estimate large displacement motion, and is capable of doing so even when the object(s) is still observed within the SAR map, but due to the motion of the target object, the image pixels on and around the target object have been blurred or smeared. This method first performs regional subset(s) of the original SAR image and then performs coarse range alignment and then autofocusing on the subsets. The coarse range cell alignment allows estimation of the large displacement motion from the range cell drift. Using the subset phase error function, detection and estimation of fine motion and displacement is made based on the amplitude and frequency of the phase function.

DETAILED DESCRIPTION OF PREFERRED EMBODIMENTS

Figure 1:
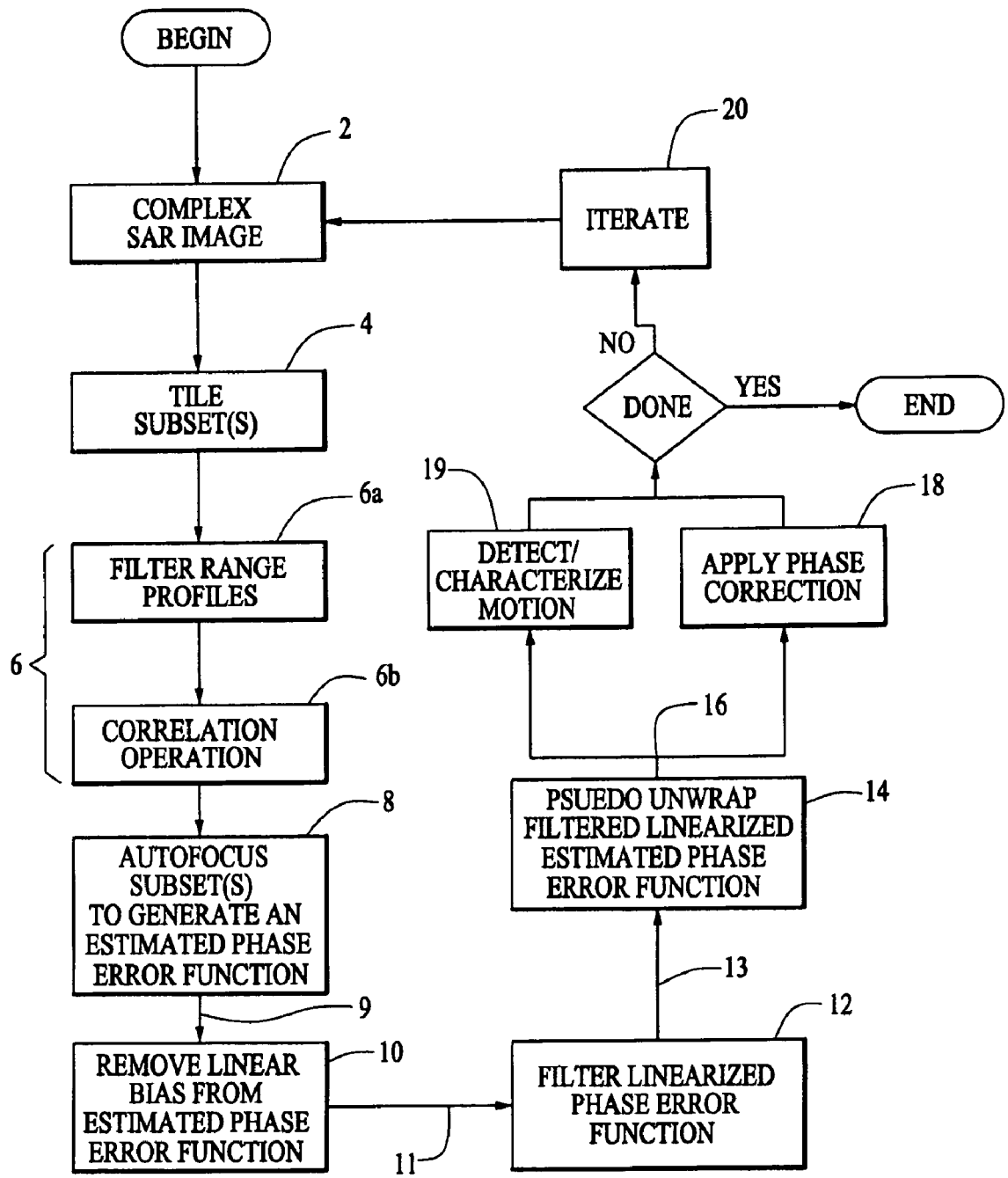
FIG. 1 is a block diagram of a preferred embodiment of a method practiced in accordance with the principles of the present invention.

FIG. 1 is a flowchart of the steps performed in the preferred embodiment of a method performed in accordance with the principles of the present invention. The first step includes providing a complex Synthetic Aperture Radar ("SAR") image (step 2 in FIG. 1). The next step is to either tile the image (step 4 in FIG. 1), or perform a single or multiple regional subset(s) of the SAR image. The regional subset(s) of the SAR image are defined such that the area of the regional subset (s) encloses or surrounds the object(s) of interest ("target object(s)") and some background as well. The present invention can use a single regional subset or a plurality of regional subsets. If the entire image is tiled, yielding a plurality of regional subsets that comprise the entire area of the image, this technique provides a means for automatic localized blur detection within a complex SAR image. This technique may also be used on single or multiple objects of interest as well. For illustrative purposes, description of how the method works on a single subset will be described.

After at least one regional subset has been defined, coarse range cell alignment (step 6 in FIG. 1) is performed on the regional subset of the original complex SAR image to estimate and address large drift displacement motion. One reason this is done is to improve the accuracy of the calculation of large and fine displacement motion. In the coarse range alignment step (step 6 in FIG. 1), range profiles are aligned in cases where target object motion results in scattering centers that drift in range by more than one cell throughout the imaging aperture. More particularly, the coarse range cell alignment step (step 6 in FIG. 1) consists of two sub-steps (steps 6a and 6b in FIG. 1). The first sub-step (step 6a in FIG. 1) in coarse range cell alignment (step 6 in FIG. 1) is to filter the range profiles to remove unwanted noise or other ambiguities by any conventional methods 6a. The next step (6b in FIG. 2) in coarse range cell alignment (step 6 in FIG. 2) is to perform a correlation operation, using any conventional means that determines the amount of drift or range cell shift, and then compensating for, or removing, the shift to yield an image that more closely resembles the image of a target object that was not in motion (6b in FIG. 1). One of the many possible implementations of the second step in coarse range cell alignment (step 6b in FIG. 1) that falls within the principles of the present invention can be found in U.S. Pat. No. 5,757,309. The correlation operation (step 6b in FIG. 1) is a way to match one range profile to another range profile that is displaced in range. The large drift displacement motion is then estimated by the amount of range cell shift.

After coarse range alignment (step 6 in FIG. 1) is performed, the subset is autofocused (step 8 in FIG. 1). Any autofocus technique suitable for handling the expected order of the errors may be used. Some techniques such as the map drift (MD) method work well when the error is quadratic. The MD algorithm can be extended to include higher order errors by dividing into more than two subapertures, but this generally works only to a certain extent as the order is increased.

When the data contains arbitrary phase errors, the autofocus technique preferred is of the phase derivative or difference type, not to be confused with Niho's technique. One method that works well for arbitrary phase errors is the Phase Gradient Algorithm (PGA), (P. H. Eichel, D. C. Ghiglia, and C. V. Jakowatz, "Phase Correction System for Automatic Focusing of Synthetic Aperture Radar," U.S. Pat. No. 4,924, 229, Filed Sep. 14, 1989, issued May 8, 1990), using an estimation kernel from the Knox-Thompson method and Feinup. (Keith T. Knox and Brian J. Thompson. "*Recovery of images From Atmospherically Degraded Short-Exposure Photographs,*" *The Astrophysical Journal*, Vol. 193, No. 1 (October 1974) pp. L45-L48); (Keith T. Knox, "*Image Retrieval from Astronomical Speckle Patterns,*" *J. Opt. Soc. Am.*, Vol. 66, No. 11 (November 1976), pp. 1236-1239); (J. R. Fienup, "*Phase Error Correction by Shear Averaging,*" *Signal Recovery and Synthesis III: Summaries of papers Presented at the Signal Recovery and Synthesis III Topical Meeting,* 14-16 Jun. 1989, N. Falmouth, Cape Cod, MASS, pp. 134-13). Other autofocus algorithms may be used.

For illustrative purposes, a PGA like implementation is described. The estimation kernel of one possible PGA like implementation is:

$$\Delta\phi(n) = L \sum_{m=0}^{M-1} E(m, n+1)E(m, n)^*,$$

where

Δϕ(n) is the difference phase estimate

M is the number of rows (in the image matrix)

m is the row index n the column index and E is the electric field (or complex quantity). Any estimation kernel suitable for estimating the expected subset phase errors may be used.

Under certain statistical assumptions, it has been shown that this kernel yields a maximum likelihood estimator of the phase derivative. Once the maximum likelihood estimator of the phase derivative is found, the estimated phase error function is obtained by integration. In discrete form, the estimated phase error function is described by the following equation, where ϕ (n=0)=0 is assumed:

$$\phi(n) = \sum_{n'=0}^{n} \Delta\phi(n'),$$

where

ϕ(n) is the phase estimate n' is a variable for the computation n is the bin index Once the estimated phase error function is found on a subset region, the fine displacement motion can be detected by the amplitude and frequency of oscillation of the estimated phase error function. The estimated phase error function is estimated by the described method and is generally done using an iterative procedure.

In the preferred embodiment, linear bias present in the estimated phase error function is removed (using any conventional techniques) (step 10 in FIG. 1). More specifically, linear bias—bias that would be present in or from a SAR image even if the SAR image was an image of a static object—is removed or reduced using any conventional technique (step 10 in FIG. 1). One possible method of removing the linear bias in accordance with the principles of the present invention—a very simple method—involves approximating the slope of a representative portion of the phase error function and removing that slope from the phase error function (step 10 in FIG. 1). The goal of the removing or reducing the linear bias step (step 10 in FIG. 1) is to remove the linear bias that is present in or from an SAR image even if the SAR image is an image of a static object. In an embodiment of the present invention where this step (step 10 in FIG. 1) is performed, the resulting function is referred to, for reference purposes only, in this specification including the claims as an "unbiased estimated phase error function" (11 in FIG. 1).

Slow varying low frequency components of the unbiased estimated phase error function (11 in FIG. 1) (or a pseudo-unwrapped unbiased estimated phase error function) can be removed using any conventional means (step 12 in FIG. 1). One preferred means for removing the slow varying low frequency components (step 12 in FIG. 1) is a Finite Impulse Response ("FIR") filter. Any high pass filtering scheme can be used. The purpose is to subtract out slow varying low frequency components that are present in the estimated phase error function that do not represent actual target object motion. A person having ordinary skill in the art will be able to identify 'slow' varying and 'low' frequency components—components that do not represent actual target object motion—thereby enabling such a person to select, and set up, a filter to remove 'slow' varying 'low' frequency components. Where this step (step 12 in FIG. 1) is performed on an unbiased estimated phase error function that was not subjected to a pseudo unwrapping step, the resulting function is referred to in this specification including the claims as a "filtered unbiased estimated phase error function" (function 13 in FIG. 1). Where this step (step 12 in FIG. 1) is performed on an unbiased estimated phase error function that had been pseudo unwrapped, the resulting function is referred to in this specification including the claims as a "filtered pseudo unwrapped unbiased estimated phase error function".

Large displacement motion cause large changes in phase, which can be wrapped and can have piecewise phase biases as a function of sample points in the estimated phase error function. This is in part because phase is equivalent every n multiples of 2π radians. A pseudo-unwrap technique (step 14 in FIG. 1) may be used to remove or reduce wrapped biases that may be present and to better estimate the phase unambiguously.

After any systems biases have been removed, such as constant biases and other piece-wise linear biases (which can be removed by piecewise linearizing the phase error function), the next step is to unwrap the phase which can be done using a pseudo-unwrap technique. Piecewise linearizing the phase function may also be done after pseudo-unwrapping as well. As used in this specification including the claims, phase wrapping is generally identified by abrupt changes and/or sharp discontinuities in phase where the derivative (between successive bins or points) changes sign and successive phase points change by more than $\Delta\phi_{max}$, (a user defined quantity set depending on the expected time response for the case being processed), manifesting in phase points that are +/−n2π from the unwrapped phase. In general the user defined quantity $\Delta\phi_{max}$ can be less than π radians. In contrast, a conventional unwrapper simply eliminates discontinuities whose values exceed π. Pseudo-unwrapping comprises unwrapping only the wrapped portions of the phase function, point by point, for instance in general leaving the points of the function to the left of the wrapped point(s) or segment unchanged and to the right of the wrapped point(s) or segment unchanged with respect to the wrapped point(s) or segment. Any constant biases of n2π present in the phase error function are also removed. Each wrapped phase point is unwrapped by changing the phase by +/−n2α such as to eliminate the discontinuities. This can be done by minimizing the variance of the differences between unwrapped points, so as not to overestimate the unwrapped phase. Depending of the expected time response, this may be altered to keep from underestimating. As a simplified illustrative example, consider FIG. 2.

Figure 2A:
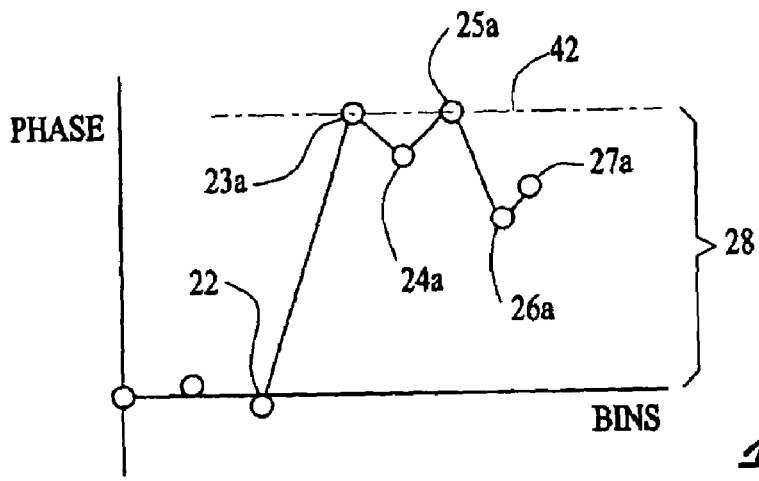
FIG. 2 is an exemplary graphical representation of one possible implementation of a process described as pseudo unwrapping in the specification, including the claims.
Figure 2B:
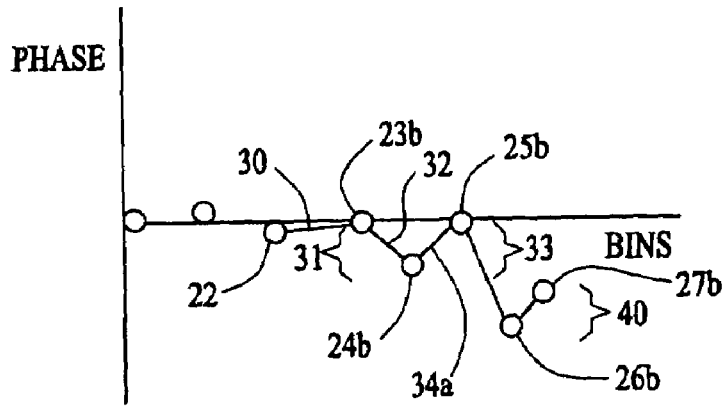
Figure 2C:
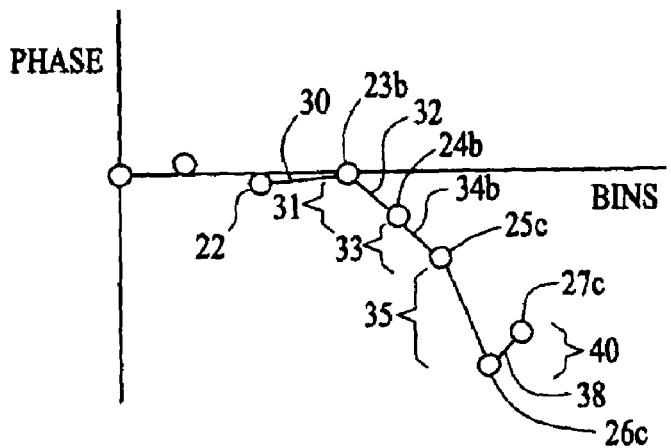

First, the estimated phase error function is corrected for any phase bias (which can be due to a relatively large displacement). Ideally, for instance a relatively large bias could be identified where the "zero" point (21 in FIG. 2A) of the graphed data is shifted by an integer number, n, times 2π displacement. However, in practice, the amount of displacement that indicates a shift in the "zero" point (a shift that is corrected in one embodiment of the present invention) may be a non-integer number times 2π displacement. A person having ordinary skill in the art will be able to recognize a shifted "zero" point. FIG. 2A illustrates a graphical representation of one possible manifestation of a phase bias that would be corrected for as part of the pseudo unwrapping step in one possible embodiment of a method performed according to principles of the present invention. In FIG. 2A, the "zero" point (22) has been shifted by a multiple of 2π. As mentioned above, a relatively large bias will ideally be indicated by an integer number multiple of 2π, but in practice the relatively large bias will likely not be a whole number multiple of 2π. The function is corrected so that the "zero" point is removed. FIG. 2B illustrates the function in FIG. 2a after correcting the function in FIG. 2a for phase bias.

Second, in this particular embodiment of a pseudo unwrapper that unwraps according to the principles of the present invention, the resulting function (with the relative large bias having been corrected for) is unwrapped by adding or subtracting n2π to every phase point that is the last point in a successive pair of successively paired phase points, where the derivative of the first pair of the successive pair of phase points has a different signed derivative than the derivative of the second pair of the successive pair of phase points, and each pair of successive phase points has a change of phase at least $\Delta\phi_{max}$. A successive pair of successively paired phase points contains exactly three phase points that are bin-wise successive. The first pair of the successive pair of successively paired phase points contains the two (of the three successive) phase points that represent the lower two of three bin numbers, while the second pair of the successive pair of successively paired phase points contains the two (of the three successive) phase points that represent the greater two of three bin numbers. One possible successive pair of successively paired phase points in FIG. 2B includes phase points 22, 23b, and 24b, with the first pair being 22 and 23b, and the second pair being 23b and 24b. Another possible successive pair of successively paired phase points in FIG. 2B includes phase points 23b, 24b, and 25b, with the first pair being 23b and 24b, and the second pair being 24b and 25b.

The preferred embodiment of a method performed in accordance with the principles of the present invention includes both a step to remove slow varying low frequency components (step 12 in FIG. 1) and pseudo unwrapping (step 14 in FIG. 1). However, the principles of the present invention allow for a method performed in accordance with the principles of the present invention that includes only one step to remove slow varying low frequency components (step 12 in FIG. 1) and pseudo unwrapping (step 14 in FIG. 1). Where a pseudo unwrapping step is performed, but not a step to remove slow varying low frequency components, the resulting function is referred to in this specification including the claims as an "unwrapped unbiased estimated phase error function". Where a step to remove slow varying low frequency component is performed, but a pseudo unwrapping step is not performed, the resulting function is referred to in this specification including the claims as an "unwrapped unbiased estimated phase error function".

Further, though the preferred embodiment of a method performed in accordance with the principles of the present invention includes both a step to remove slow varying low frequency components (step 12 in FIG. 1) and pseudo unwrapping (step 14 in FIG. 1), a method performed in accordance with the principles of the present invention may include neither a step to remove slow varying low frequency components (step 12 in FIG. 1) nor pseudo unwrapping (step 14 in FIG. 1); in that case, the resulting function is referred to in this specification including the claims as an "unbiased estimated phase error function".

Where both a step to remove slow varying low frequency components 12 and pseudo unwrapping 14 are performed, Applicant prefers to remove slow varying low frequency components 12 of the estimated phase error function before pseudo unwrapping 14. In that case, the filtered unbiased phase error function would be pseudo unwrapped, resulting in what is referred to in this specification including any claims as a "pseudo unwrapped filtered unbiased estimated phase error function". However, in accordance with the principles of the present invention, the unbiased estimated phase error function may be pseudo unwrapped 14 prior to removal of slow varying low frequency components from the estimated phase error function 12; in that case, the pseudo-unwrapped unbiased estimated phase error function would be filtered, resulting in what is referred to in this specification including the claims as a "filtered pseudo unwrapped unbiased estimated phase error function".

Motion may be estimated from the estimated phase error function, the unbiased estimated phase error function, the filtered unbiased estimated phase error function, the pseudo unwrapped unbiased estimated phase error function, the filtered pseudo unwrapped unbiased phase error function, or the pseudo unwrapped filtered unbiased phase error function, by solving for d from the following equation, $\phi=2\pi d/\lambda_c$, where $\phi$ is the estimated phase error, d the displacement, and $\lambda_c$ is the wavelength. Motion can be characterized from the amplitude and frequency of oscillation of the unbiased estimated phase error function, the filtered unbiased estimated phase error function, the pseudo unwrapped unbiased estimated phase error function, the filtered pseudo unwrapped unbiased phase error function, or the pseudo unwrapped filtered unbiased phase error function. Displacement as a function of time can be detected from the amplitude of the unbiased estimated phase error function, the filtered unbiased estimated phase error function, the pseudo unwrapped unbiased estimated phase error function, the filtered pseudo unwrapped unbiased phase error function, or the pseudo unwrapped filtered unbiased phase error function, as a function of the sample bins, which are time step samples.

The unbiased estimated phase error function, the filtered unbiased estimated phase error function, the pseudo unwrapped unbiased estimated phase error function, the filtered pseudo unwrapped unbiased phase error function, or the pseudo unwrapped filtered unbiased phase error function, may be phase corrected by using an autofocus technique 18. Further, the process described may be iterated multiple times 20.

The invention claimed is:

1. A method for detecting motion comprising:
   providing an original complex SAR image, the SAR image having a target object;
   defining a regional subset of the original complex SAR image;
   performing coarse range cell alignment on said regional subset;
   autofocusing said regional subset to produce an estimated phase error function;
   analyzing the amplitude and frequency of said generated estimated phase error function;
   detecting motion of said target object based on said analysis.

2. The method of claim 1 further comprising the steps of:
   removing linear bias present in said estimated phase error function to provide an unbiased estimated phase error function;
   analyzing the amplitude and frequency of said unbiased estimated phase error function; and detecting motion of said target object based on said analysis.

3. The method of claim 1 further comprising the steps of:
filtering said estimated phase error function to remove slow variations and low frequency components to produce a filtered estimated phase error function;
analyzing the amplitude and frequency of said filtered estimated phase error function; and
detecting motion of said target object based on said analysis.

4. The method of claim 1 further comprising the steps of:
pseudo unwrapping said estimated phase error function to yield a pseudo unwrapped estimated phase error function;
analyzing the amplitude and frequency of said pseudo unwrapped estimated phase error function; and
detecting motion of said target object based on said analysis.

5. The method of claim 1 further comprising the steps of:
removing linear bias present in said estimated phase error function to provide an unbiased estimated phase error function;
filtering said unbiased estimated phase error function to remove slow variations and low frequency components from said unbiased estimated phase error function to produce a filtered unbiased estimated phase error function;
analyzing the amplitude and frequency of said filtered unbiased estimated phase error function; and
detecting motion of said target object based on said analysis.

6. The method of claim 1 further comprising the steps of:
removing linear bias present in said estimated phase error function to provide an unbiased estimated phase error function;
pseudo unwrapping said unbiased estimated phase error function to yield a pseudo unwrapped unbiased estimated phase error function;
analyzing the amplitude and frequency of said pseudo unwrapped unbiased estimated phase error function; and
detecting motion of said target object based on said analysis.

7. The method of claim 1 further comprising the steps of:
removing linear bias present in said estimated phase error function to provide an unbiased estimated phase error function;
filtering said unbiased estimated phase error function to remove slow variations and low frequency components from said unbiased estimated phase error function to produce a filtered unbiased estimated phase error function;
pseudo unwrapping said filtered unbiased estimated phase error function to yield a pseudo unwrapped filtered unbiased estimated phase error function;
analyzing the amplitude and frequency of said pseudo unwrapped filtered unbiased estimated phase error function; and
detecting motion of said target object based on said analysis.

8. The method of claim 1 further comprising the step of:
Estimating fine displacement motion by solving for d in the equation $\phi=2\pi d/\lambda_c$, where $\phi$ is the estimated phase error.

9. The method of claim 2 further comprising the step of:
Estimating fine displacement motion by solving for d in the equation $\phi=2\pi d/\lambda_c$, where $\phi$ is the estimated phase error.

10. The method of claim 3 further comprising the step of:
Estimating fine displacement motion by solving for d in the equation $\phi=2\pi d/\lambda_c$, where $\phi$ is the estimated phase error.

11. The method of claim 4 further comprising the step of:
Estimating fine displacement motion by solving for d in the equation $\phi=2\pi d/\lambda_c$, where $\phi$ is the estimated phase error.

12. The method of claim 5 further comprising the step of:
Estimating fine displacement motion by solving for d in the equation $\phi=2\pi d/\lambda_c$, where $\phi$ is the estimated phase error.

13. The method of claim 6 further comprising the step of:
Estimating fine displacement motion by solving for d in the equation $\phi=2\pi d/\lambda_c$, where $\phi$ is the estimated phase error.

14. The method of claim 7 further comprising the step of:
Estimating fine displacement motion by solving for d in the equation $\phi=2\pi d/\lambda_c$, where $\phi$ is the estimated phase error.

15. The method of claim 1 further comprising the step of:
Characterizing fine displacement motion of the target object based on the amplitude and frequency of the estimated phase error function.

16. The method of claim 2 further comprising the step of:
Characterizing fine displacement motion of the target object based on the amplitude and frequency of the unbiased estimated phase error function.

17. The method of claim 3 further comprising the step of:
Characterizing fine displacement motion of the target object based on the amplitude and frequency of the filtered estimated phase error function.

18. The method of claim 4 further comprising the step of:
Characterizing fine displacement motion of the target object based on the amplitude and frequency of the pseudo unwrapped estimated phase error function.

19. The method of claim 6 further comprising the step of:
Characterizing fine displacement motion of the target object based on the amplitude and frequency of the pseudo unwrapped unbiased estimated phase error function.

20. The method of claim 7 further comprising the step of:
Characterizing fine displacement motion of the target object based on the amplitude and frequency of the pseudo unwrapped filtered unbiased estimated phase error function.

* * * * *